United States Patent
Grill

(10) Patent No.: US 6,761,083 B1
(45) Date of Patent: Jul. 13, 2004

(54) DRIVE DEVICE COMPRISING AN ECCENTRIC GEARING

(75) Inventor: Joachim Grill, Bondorf (DE)

(73) Assignee: IMS Gear GmbH (DE)

( * ) Notice: Subject to any disclaimer, the term of this patent is extended or adjusted under 35 U.S.C. 154(b) by 0 days.

(21) Appl. No.: 10/031,416

(22) PCT Filed: Jul. 14, 2000

(86) PCT No.: PCT/EP00/06746
§ 371 (c)(1),
(2), (4) Date: Apr. 24, 2002

(87) PCT Pub. No.: WO01/06148
PCT Pub. Date: Jan. 25, 2001

(30) Foreign Application Priority Data

Jul. 16, 1999 (DE) .......................... 199 32 876

(51) Int. Cl.⁷ .............................................. F16H 55/17
(52) U.S. Cl. .......................................... 74/437; 74/457
(58) Field of Search ........................ 74/437, 439, 457, 74/460, 384, 413, 414

(56) References Cited

U.S. PATENT DOCUMENTS

| | | | | |
|---|---|---|---|---|
| 3,721,131 A | * | 3/1973 | Ingham | 74/393 |
| 3,992,960 A | * | 11/1976 | Rulseh | 74/393 |
| 5,566,593 A | * | 10/1996 | Vordermaier | 74/625 |
| 5,590,491 A | * | 1/1997 | Piltingsrud | 49/342 |
| 2001/0013714 A1 | * | 8/2001 | Ochiai et al. | 296/223 |
| 2001/0046919 A1 | * | 11/2001 | Hagiike | 475/181 |

FOREIGN PATENT DOCUMENTS

| | | | | |
|---|---|---|---|---|
| DE | 910 509 C | * | 5/1954 | |
| DE | 197 39 851 A | * | 3/1999 | |
| EP | 0 181 631 A | * | 5/1986 | |
| EP | 0 918 961 A | * | 6/1999 | |
| FR | 452 468 A | * | 5/1913 | |
| JP | 63172057 | * | 7/1988 | |

* cited by examiner

*Primary Examiner*—David Fenstermacher
(74) *Attorney, Agent, or Firm*—Pendorf & Cutliff

(57) ABSTRACT

The invention relates to a drive device, for driving a regulating unit. Said device has a gearing (20) mounted between a motor (10) and the regulating unit (30). The gearing (20) has at least a first gearing stage (22) which is coupled to an output shaft of the motor (10) and a subsequent second gearing stage (24), whereby the second gearing stage (24) is configured as an eccentric gearing stage.

10 Claims, 4 Drawing Sheets

DRIVE DEVICE COMPRISING AN ECCENTRIC GEARING

BACKGROUND OF THE INVENTION

1. Field of the Invention

The invention is concerned with a drive device with an eccentric gearing.

2. Description of the Related Art

In many applications of gears, a maximal drive moment is required only beginning at a particular point. Such requirements occur for example in gears which are used in a locking function. In the construction industry, this could be a window closer or, in the automotive industry, a closure tightening aid, or a gear for closing of air flaps.

If the drive occurs via an electric motor, and if a gearing with a constant transmission or speed change curve is employed, there results the disadvantage that the ratio of the transmission must be so high on the one side that the maximal moment can be achieved with the employed motor. This requires as a rule a high adjustment time or adjustment time of the gearing. The adjustment time is limited in many applications, such as for example during the closure of an air flap, which must be closed in response to fire, or in climate control devices or in window closers.

In order to maintain the adjustment time within prescribed limits, it is necessary in this case to employ a stronger and thus more expensive motor, in order to reduce the transmission ratio and therewith to maintain the adjustment time within the prescribed limits while achieving the required drive moment.

It is a further disadvantage, that in the case of stronger motors also stronger electric currents are needed, whereby also the control of the motor becomes substantially more expensive. In the design of the gear unit thus in many cases a maximum current is not to be exceeded. Even in the case of a weaker direct current motor there is the problem that the current requirement increases with decreasing motor speed.

A further disadvantage of such a design is that, in the case of the commonly employed direct current motors, the RPM of the motor depends upon the required motor moment. The motor has a changing RPM during this resetting or adjustment. This change in RPM has a negative effect on the subjective noise sensitivity and is not accepted as such in the above-described environments of use—in the construction and automotive industry.

SUMMARY OF THE INVENTION

It is the task of the invention to avoid the above-described disadvantages and to produce a drive device in such a manner that the required drive moment is achieved with a weaker motor and, at the same time, the adjustment time of the gearing is reduced.

The solution is comprised therein, that instead of a drive with continuous transmission, a two-stage drive is employed, wherein the second stage is an eccentric gearing. The first stage can be a conventional gearing. Preferably the first gearing stage is a harmonic drive system or a wave generator as described in detail by applicants in issued European Patent EP 0 918 961 B1 (U.S. Pat. No. 6,220,115 B1). For the purpose of disclosure the content of this patent is incorporated herein by reference. The transmission elements of the therein described wave generator (also referred to as harmonic-drive-gearing) are planetary gears.

Eccentric gears are gears with non-constant transmission behavior, and as such are already known. One example of an eccentric gear is described in DE 197 39 851 A1. Therein the gearing is used for driving a windshield wiper for an automobile. The eccentric gear is herein exclusively used in order to produce a back and forth movement of the windshield wiper. The therein described eccentric gearing is however not employed for achieving a particular transmission power curve or for reducing adjustment times.

One solution according to the invention is also concerned with a process, in which the behavior curve of the required drive moment, and the given motor characteristic curve of the employed driver, are determined for the optimal transmission curve, so that therewith the above-described disadvantages can be avoided. The optimization further distinguishes between the individual types of electric motors, for example between a direct current motor and a stepping motor.

A particular advantage of the invention is comprised therein, that by the optimization of the transmission curve during use of a direct current motor this can be driven with substantially more constant RPM over the entire range of adjustment, whereby the drive or gear noise is substantially reduced.

BRIEF DESCRIPTION OF THE DRAWINGS

The invention will be described and explained on the basis of a first and second illustrative embodiment represented in the figures.

In the figures there is shown.

DETAILED DESCRIPTION OF THE INVENTION

The invention is further comprised therein, that each individual gear tooth has its own individual basic profile, so that each tooth can be optimized with respect to rigidity, noise, tolerance and degree of effectiveness. Particularly in the case of gears not generated by planing or shaping, that is, for example, gears produced by injection molding, sintering or by broaching produced eccentric gears, there result significant advantages even in the case of non-involute (non-curved) gears on the basis of the produced undercuts, when the curvature of the generating cam is too large at points.

The sequence of the adaptation of an eccentric gear occurs iteratively in multiple steps as follows:

First, from the drive moment curve and the motor characteristic curve a first optimized transmission curve is determined. From this, the polar curve or centrode of the eccentric gear is determined. Subsequently from a conventional reference profile, in which however each tooth can be different, the teeth of the eccentric gear are calculated. Subsequently, using a roller simulation the tensions occurring during the movement and the resulting degrees of effectiveness are determined. Since the degree of effectiveness curve has an influence on the RPM during the adjustment time, with the gears there must now once again be determined the moment curve and the adjustment time.

If now the behavior is no longer acceptable, a new optimization of manufacturing or, as the case may be, optimization calculation, must be carried out, in order to optimally determine and shape or design of the generating cam and therewith the gear teeth.

Figure 1:
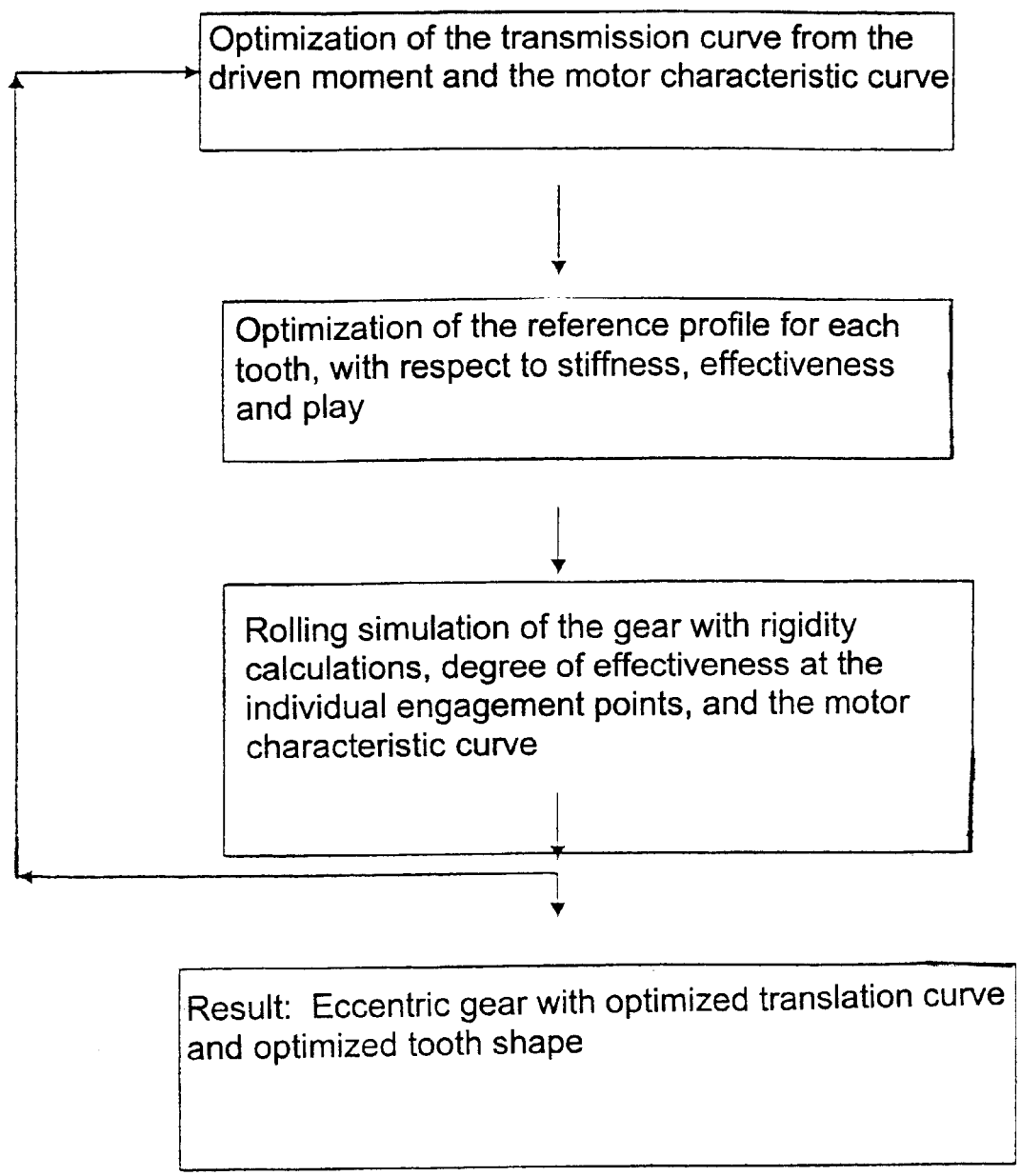
FIG. 1 shows a flow diagram of the procedure of optimization of an eccentric gear according with the prior art.

This procedure is represented in detail as a flow diagram in FIG. 1. Reference is expressly made thereto herein.

On the basis of the complex inter-relationships the optimization can only be calculated and solved using a computer program.

In the following the optimization of an eccentric gear will be illustrated using an example of a direct current motor with a given motor characteristic curve according to $$M_1 = M_1(n) \text{ or } n_1 = n(M_1), i = i(n)$$

wherein $M_1$=motor moment, i=motor current, $n_1$=RPM and a given moment $$M_2 = M_2(\phi_2),$$

wherein $M_2$=driven moment, $\phi$=driven rotation angle.

The result of the first optimization is a transmission or speed change curve or behavior according to $$i = i(\phi_2),$$

wherein i=transmission or speed change, $\phi_2$=driven rotation angle.

Further the required adjustment time and maximal current requirement are preferably reduced as far as possible, and advantageously at the same time the rotational behavior of the motor and therewith the gear noise are optimized.

In order to achieve a substantially constant rotation speed of the motor and therewith a reduction in noise, the transmission or speed change behavior is so selected as a starting value for optimization, that the motor rotational speed remains constant or substantially constant over the entire or at least substantially the entire adjustment time.

The calculation of the adjustment time of the rotation speed behavior and the current requirement requires a differential equation system, which in general cannot be explicitly solved. For this reason, as numeric process there is employed for example an explicit Euler process.

Figure 2:
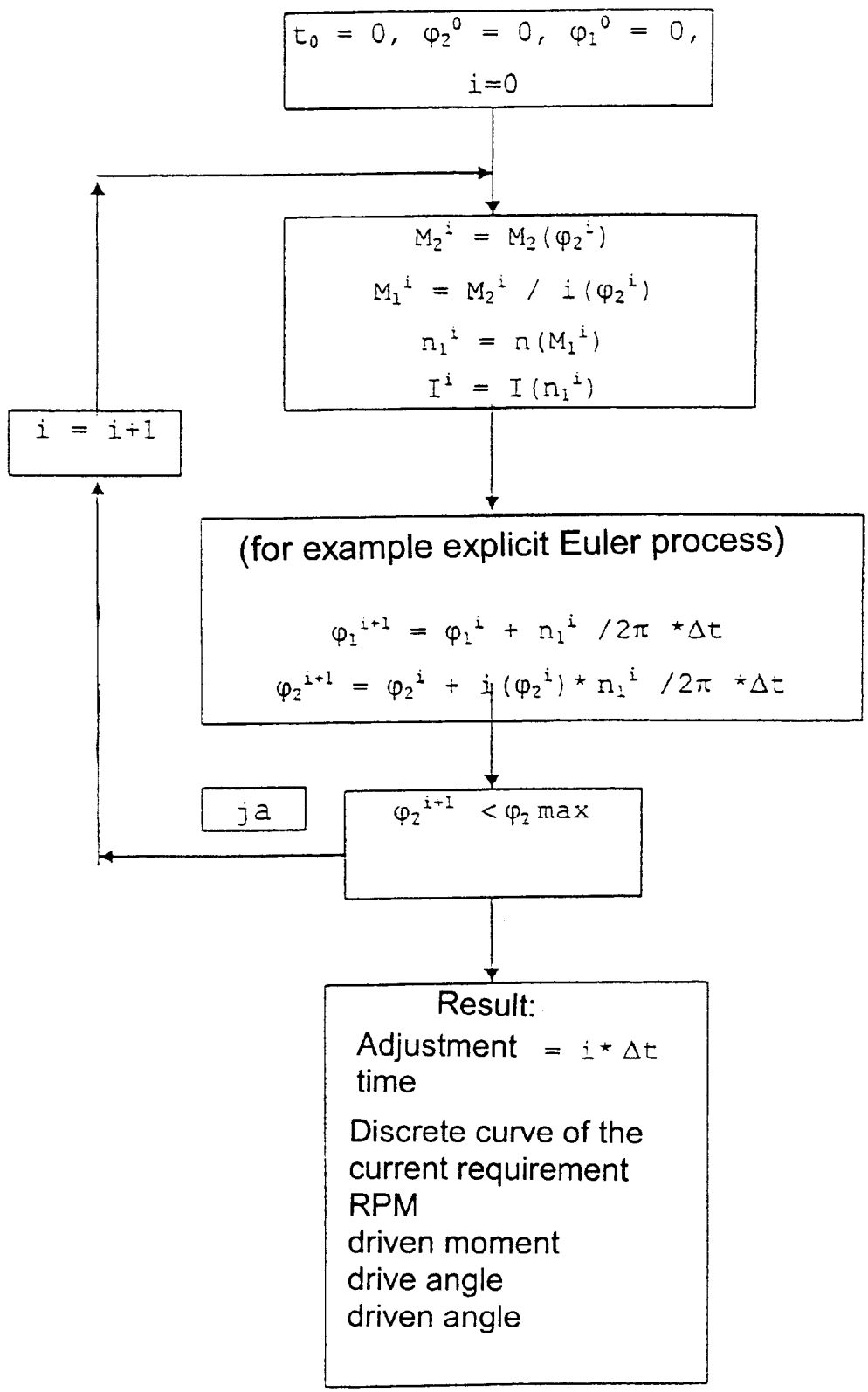
FIG. 2 shows a flow diagram of the individual calculation steps of the Euler process.
Figure 3:
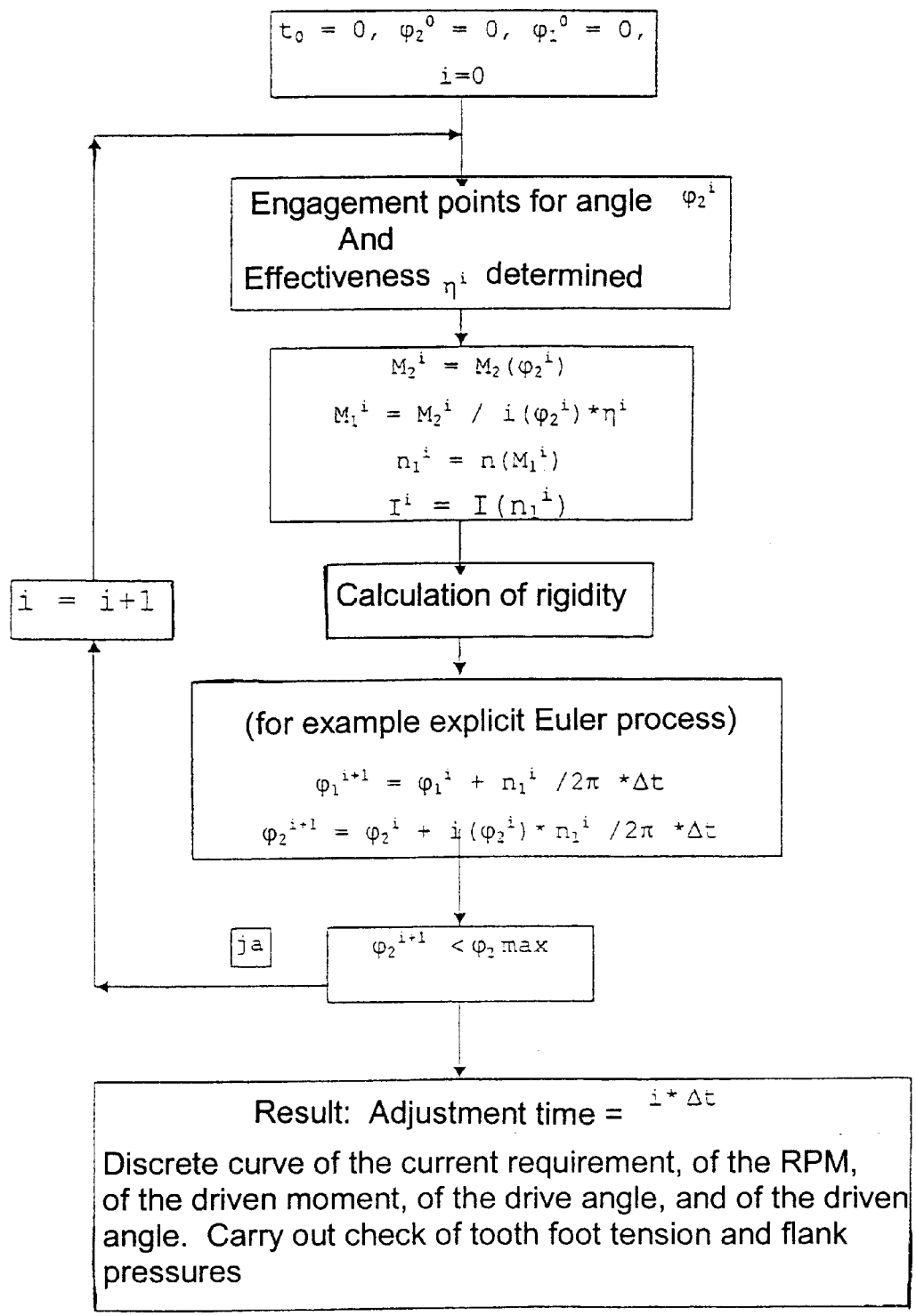
FIG. 3 shows a flow diagram of the procedure of optimization of an eccentric gear according with the present invention.

The individual calculation steps of the Euler process are represented in the flow diagram according to FIG. 2, to which reference is expressly made.

From the characteristic profile of the two eccentric gears, next the gear geometry is determined. Then the tooth foot tensions, flank pressures and deformation of the teeth in the case of plastic gear wheels are determined and optimized. Further, the effectiveness at each engagement point is determined. In the next step the calculation of the adjustment times is carried out once again, however this time including the degree of effectiveness in each engagement point and therewith the tooth geometries.

Figure 4:
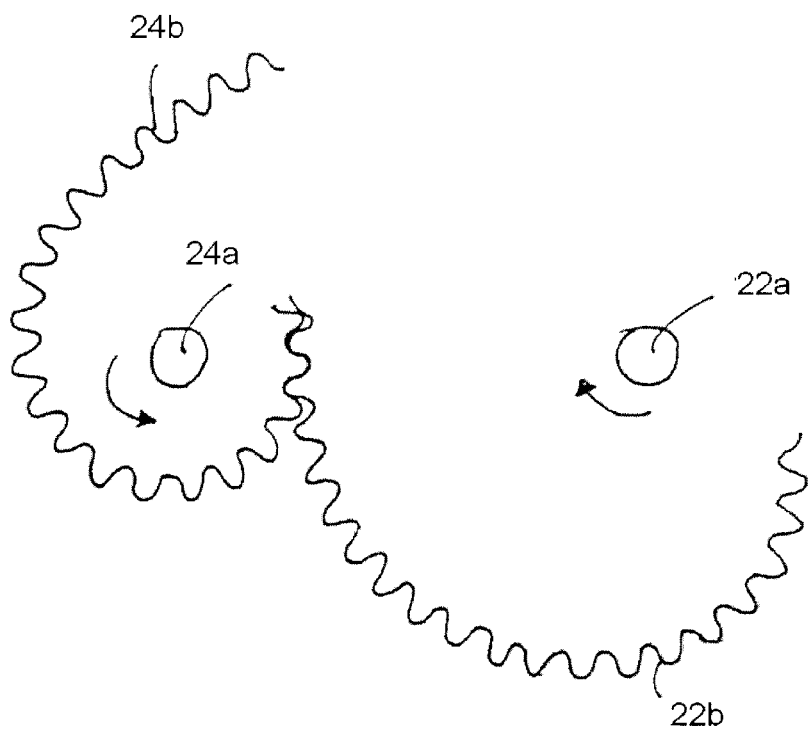
FIG. 4 shows an eccentric gear according with the present invention.
Figure 5:
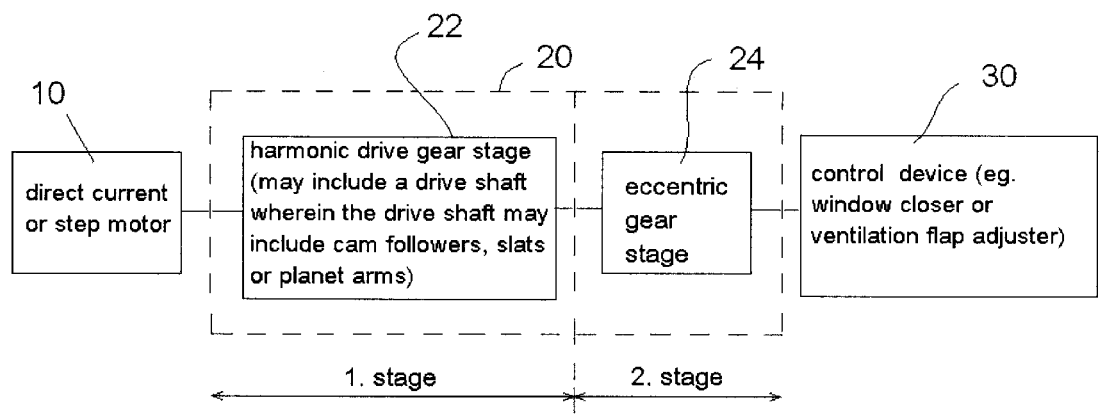
FIG. 5 shows a drive process for the design.

The drive process shown as an example in FIG. 5 shows one design for a window closer as an adjustment device or control device 30 in the construction industry with an essentially cosine-shaped curve of the drive moment (compare FIG. 4). The employed direct current motor indicated with reference number 10 in FIG. 5 has a constant rotational speed over almost the entire adjustment range. Its output shaft is coupled to a first gear stage 22 and the output thereof with a second gear stage 24. The second gear stage 24 is an eccentric gear. The overall gearing is referenced with reference number 20. Therewith the adjustment time can be reduced by 30% and the maximum current requirement can be reduced by approximately 40%. In FIG. 4 reference numbers 22a and 24a indicate shafts of the eccentric gear 24 or, as the case may be, control device 30 and 22b and 24b associated gear curves.

What is claimed is:

1. A drive device for driving a control device with
   a gearing (20) connected between a motor (10) and the control device (30), which comprises eccentric gears (22a, 24a),
   wherein the gearing (20) comprises at least a first gear stage (22) coupled to an output shaft of the motor (10) and constructed as a harmonic drive, and a following, second gear stage (24), the second gear stage (24) being constructed as an eccentric gear stage.

2. A drive device according to claim 1, wherein said motor (10) is a step motor.

3. A drive device according to claim 1, wherein said motor (10) is a direct current motor.

4. A drive device according to claim 1, wherein the control device (30) is a window closer.

5. A drive device according to claim 1, wherein the control device (30) is a ventilation flap adjuster.

6. A drive device according to claim 5, wherein the control device (30) is in an automobile.

7. A drive device according to claim 1, wherein the first gear stage (22) includes a drive shaft.

8. A drive device according to claim 7, wherein said drive shaft is a corrugated drive with transmission elements selected from the group consisting of cam followers, slats and planet arms.

9. A drive device according to claim 1, wherein the drive device describes an adjustment path with an adjustment angle of less than 360°.

10. A drive device according to claim 9, wherein the second gear stage (24) is dimensioned so that a larger torque in comparison with the start of the regulating operation acts on a control element of the control device (30) in the region of the end of the adjustment path.

* * * * *